April 5, 1966  D. MATTHEWS  3,243,976
PRODUCTION OF RIB WELTS FOR KNITTED GARMENTS
Filed Jan. 23, 1964  9 Sheets-Sheet 1

April 5, 1966 D. MATTHEWS 3,243,976
PRODUCTION OF RIB WELTS FOR KNITTED GARMENTS
Filed Jan. 23, 1964 9 Sheets-Sheet 2

April 5, 1966 D. MATTHEWS 3,243,976
PRODUCTION OF RIB WELTS FOR KNITTED GARMENTS
Filed Jan. 23, 1964 9 Sheets-Sheet 3

April 5, 1966   D. MATTHEWS   3,243,976
PRODUCTION OF RIB WELTS FOR KNITTED GARMENTS
Filed Jan. 23, 1964   9 Sheets-Sheet 5

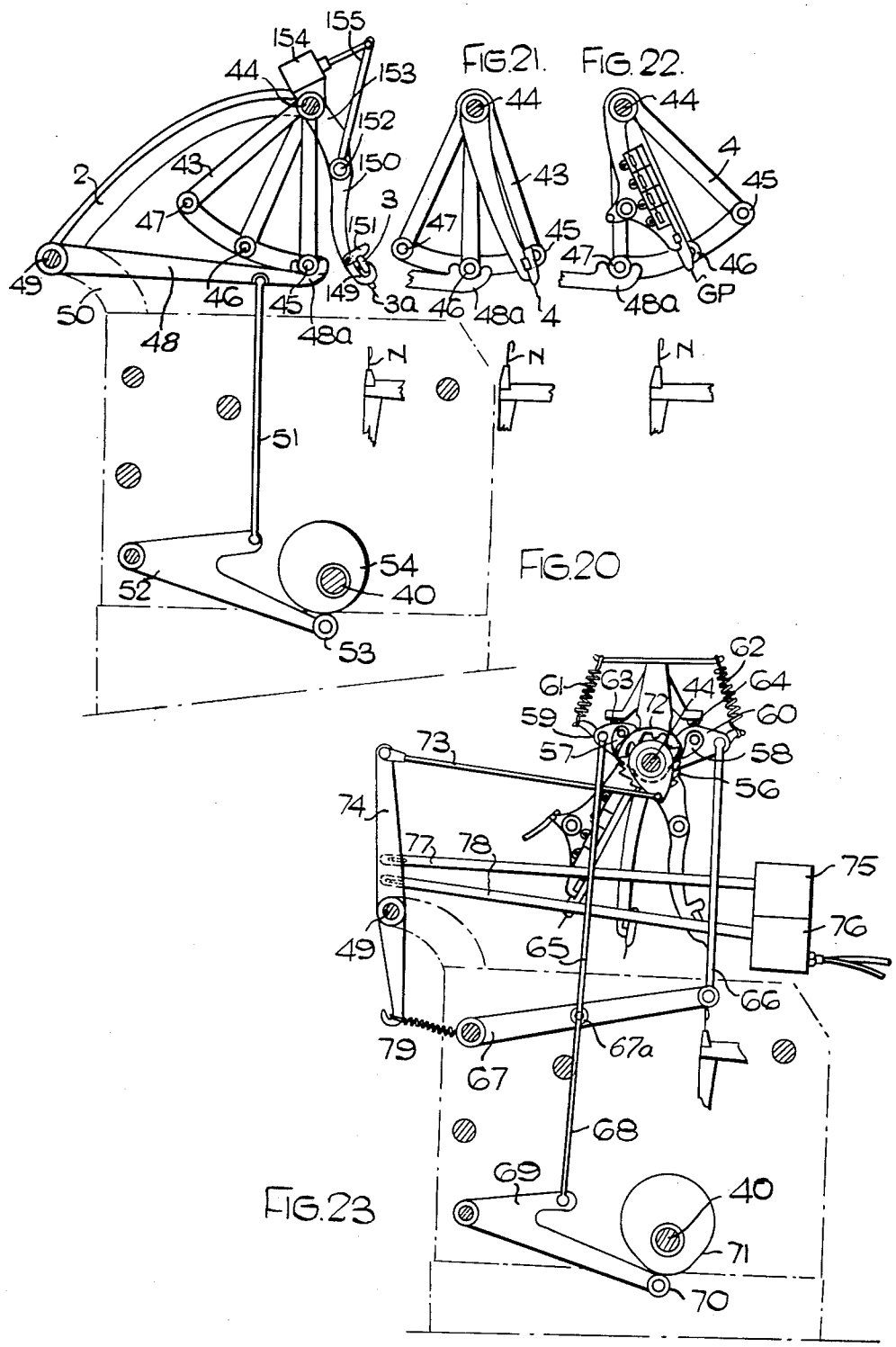

April 5, 1966     D. MATTHEWS     3,243,976
PRODUCTION OF RIB WELTS FOR KNITTED GARMENTS
Filed Jan. 23, 1964     9 Sheets-Sheet 9

United States Patent Office 3,243,976
Patented Apr. 5, 1966

3,243,976
PRODUCTION OF RIB WELTS FOR
KNITTED GARMENTS
Denis Matthews, Sutton in Ashfield, England, assignor to
Matthews & Birkhamshaw Limited, Sutton in Ashfield,
England
Filed Jan. 23, 1964, Ser. No. 339,653
Claims priority, application Great Britain, Jan. 26, 1963,
3,337/63
12 Claims. (Cl. 66—148)

This invention relates to improved production of knitted garments wherein knitted fabric such as rib welt is produced on one knitting machine such as a straight bar knitting machine of Cotton's Patent or other similar type with a fabric transfer course having a predetermined number of successive fabric transfer loops, and wherein reduction of the number of successive loops in the fabric transfer course is effected by loop transference at spaced intervals ready for transfer of the fabric transfer course to another knitting machine such as of said type for further knitted fabric to be knitted on to the preformed knitted fabric. This reduction of the number of successive loops in the fabric transfer course is generally necessary when the preformed knitted fabric is rib fabric and the knitted-on fabric is plain, i.e., non-rib fabric.

Heretofore the loops of the fabric transfer course have been run on to a point bar and while doing this the running-on operator has effected sideways transfer of loops to effect the necessary reduction in the number of successive loops, the transferring of loops causing double loops to be formed.

It has been found that the actual loop doubling operation occupies considerably more of the running-on operator's time than does the running-on operation itself.

An object of the invention is to provide for the production of said knitted garments in such improved manner that the preformed knitted fabric is prepared for transfer to the plain or non-rib machine in a particularly efficient manner.

The invention provides a method of producing knitted garments wherein knitted fabric is produced on one knitting machine with a fabric transfer course having a predetermined number of successive fabric transfer loops, and wherein reduction of the number of successive loops in the fabric transfer course for transfer to another knitting machine, so that further knitted fabric can be knitted on to the preformed knitted fabric, is effected in a separate operation away from said one machine on which the preformed knitted fabric is produced.

The invention also provides a method of producing knitted garments wherein knitted fabric is produced on one knitting machine with a fabric course having a predetermined number of successive fabric transfer loops, sideways transfer of spaced loops is effected to reduce the number of successive loops in the fabric transfer course, and the consequently reduced length fabric transfer course is transferred to needles of another knitting machine for further knitted fabric to be knitted on to the preformed knitted fabric starting with a course having the same reduced number of successive loops as the reduced length fabric transfer course, characterised by the intermediate operational steps after forming the fabric transfer course with said predetermined number of successive loops on said one machine, of operating transfer points to sideways transfer spaced loops in the fabric transfer course, taking the consequently spaced groups of loops in the fabric transfer course on correspondingly spaced groups of instruments, and closing the groups of instruments together. Conveniently the method includes transferring the loops of the fabric transfer course from the needles of said one machine to a corresponding number of points on a point bar, and in a separate operation away from said one machine effecting sideways transference of spaced loops by transfer points, followed by picking up spaced groups of loops by spaced groups of points and closing the groups of points together. Conveniently also the method includes operating at least one bar of spaced single transfer points to effect the sideways transfer of spaced loops.

More specifically the method includes transferring the fabric transfer course of loops from the point bar to machine knitting needles, operating transfer points to co-operate with the needles to effect the sideways transference of the spaced loops from their needles to next adjacent needles, operating groups of transfer points to pick up the consequently spaced groups of loops from the needles, closing the groups of points together, transferring the consequently closed groups of loops to the needles, and operating a point bar to pick up the closed groups of loops from the needles.

In a particular arrangement the method includes operating a narrowing head, by which the various points are carried, with dipping and rising motions for the transfer operations substantially in like manner to the dipping and rising motions of a narrowing head in a Cotton's Patent straight bar knitting machine.

The invention also provides a loop transfer machine comprising a row of machine knitting needles, cam operated means for operation of the row of needles in the transference of loops to and from the needles, a narrowing head, cam operated means for operating the narrowing head with dipping and rising motions, transferring mechanism carried by the narrowing head and comprising a first transfer device and a second transfer device spaced angularly from said first transfer device, cam operated means for displacing the transfer mechanism to displace said first transfer device and said second transfer device between operative and inoperative positions, means adapting said first transfer device to removably carry a point bar, said second transfer device comprising a plurality of groups of points mounted for sideways displacement relatively to each other, and means for effecting said sideways displacement of said groups of points, whereby the point bar and the groups of points can be brought separately into loop transfer co-operation with the row of needles and the groups of points can be at one time spaced and at another time together. Conveniently the machine has a third transfer device disposed angularly intermediate the first and second transfer devices and comprising at least one bar of spaced single transfer points and movable by the cam operated means for said first and second transfer devices, whereby these spaced points can be brought into and out of loop transfer co-operation with the needles, and means whereby the spaced single transfer points can be sideways displaced for sideways loop transference. Conveniently also the machine has solenoid control mechanism for controlling the direction of displacement of the transfer devices, solenoid mechanism for idling the sideways displacing means for the groups of points in the second transfer device, solenoid means for effecting pressure of the points in the first transfer device against the needles, a solenoid device for effecting the sideways displacement of the spaced single points in the third transfer device, and a solenoid device for idling part of the needle operating mechanism.

More specifically the machine has electric switches for said solenoids operated by cam operated mechanism, timing electric switches operated by a pattern drum, cam operated mechanism operating the pattern drum, and means interconnecting the electric switches whereby the solenoids are operated at required times.

In a particular arrangement the machine has means for locating the transfer devices in their operative positions comprising a quadrant device movable with the transfer devices, catch means releasably engageable with the quadrant at different positions, and cam operated means for controlling the catch device.

Conveniently the groups of points are mounted in sequence on a plurality of guide bars, spring means biases the groups of points apart, adjustable stop means controls the spacing of the groups of points, and Bowden cable mechanism is operated by cam controlled weight mechanism to close the groups of points together. Conveniently also knocking over bits co-operating with the needles, cam operated mechanism for operating the knocking over bits, sinkers for co-operating with the needles, and cam operated mechanism for operating the sinkers.

The foregoing and other features of the invention set out in the appended claims are incorporated in the methods hereinafter particularly described in greater detail by way of example with reference to the accompanying drawings in which:

FIGURE 20 is a detail view of point bar locating mechanism.

FIGURE 21 is a detail view of the locating mechanism in a different position.

FIGURE 22 is a similar detail view of the mechanism in a further different position.

FIGURE 23 is a detail sectional view of the point bar displacement mechanism.

In starting the method according to the invention, the running-on operator runs all the loops of the rib welt made on the rib machine on to individual points of a running-on or transfer bar, without any double looping.

The running-on or transfer bar is then fitted in a topping stand which is operated for topping the rib welt onto a point bar, again without any doubling of loops.

Figure 1:
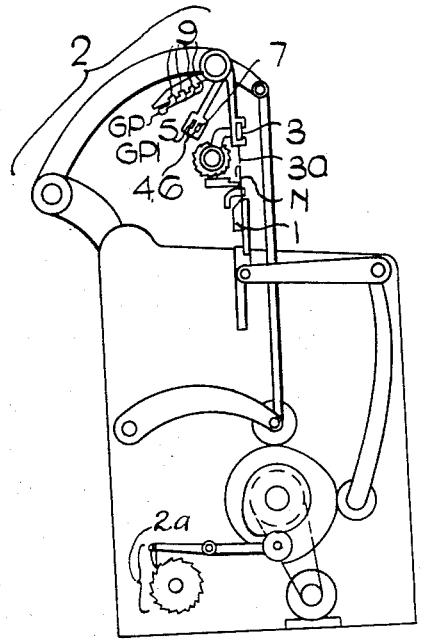
FIGURE 1 is a diagrammatic side view of a machine according to the invention.

There is also provided a loop doubling machine basically of straight bar machine construction by having, FIGURE 1, a needle bar 1 and a narrowing head 2 to which the point bar 3 having points 3a is fitted, and suitable means 2a for changing between complete and part fashioning motions.

Figure 2:
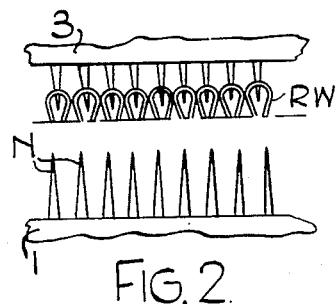
FIGURES 2 and 3 show successive steps in operation of the machine.
Figure 3:
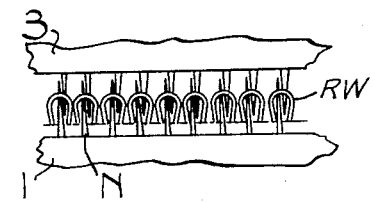
Figure 5:
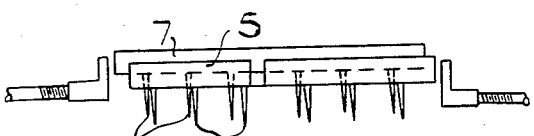
FIGURE 5 is a detail view of single point mechanism.

First the machine is operated with the well known dipping and rising motion of the narrowing head 2 to transfer the rib welts RW, FIGURES 2, 3, from the point bar 3 to the needles N.

Figure 4:
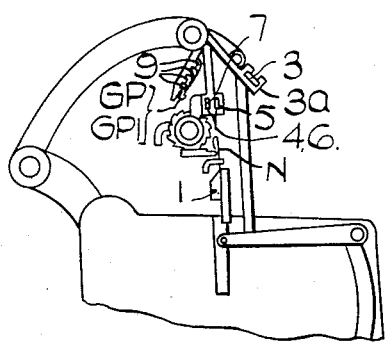
FIGURE 4 is a side view of part of the machine with parts in different positions from FIGURE 1.
Figure 6:
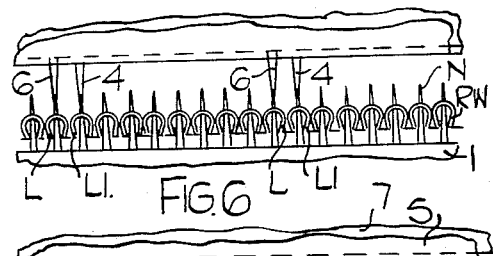
FIGURES 6 to 8 show successive steps in operation of the machine following the steps of FIGURES 2 and 3.
Figure 7:
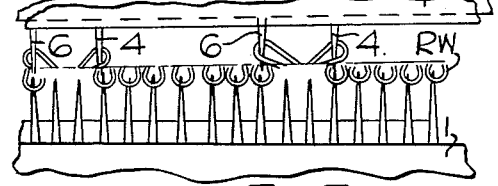
Figure 8:
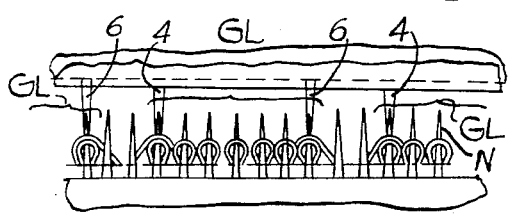

Next, after idling the point bar 3, FIGURE 4, spaced single points 4, FIGURES 5 to 8, on one rod 5 and similar spaced single points 6 on another rod 7 of the narrowing head 2 are operated with usual two dipping and rising motions and in opposite endwise directions to pick up spaced pairs of loops L, L1, FIGURE 6 from the needles and to transfer the loops of each pair L, L1 outwardly, FIGURE 7, to the next adjacent outward needles N, resulting in the formation of spaced groups GL, FIGURE 8, of loops on the needles N.

Figure 9:
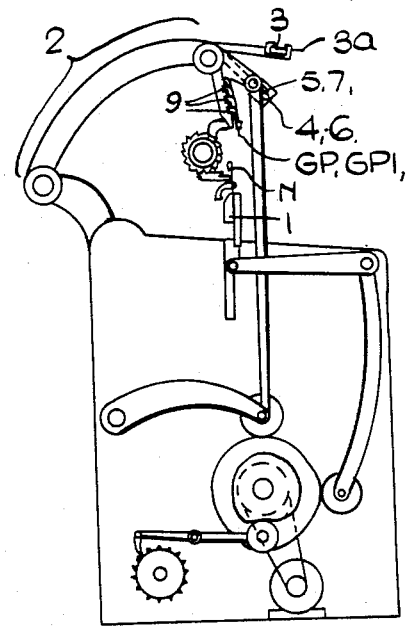
FIGURE 9 is a similar view of the machine to FIGURE 1 showing parts in different positions.
Figure 11:
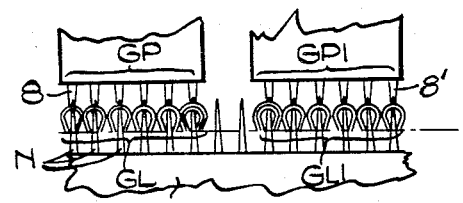
FIGURES 11 to 14 show successive steps in operation of the machine following the steps of FIGURES 6 to 8.
Figure 10:
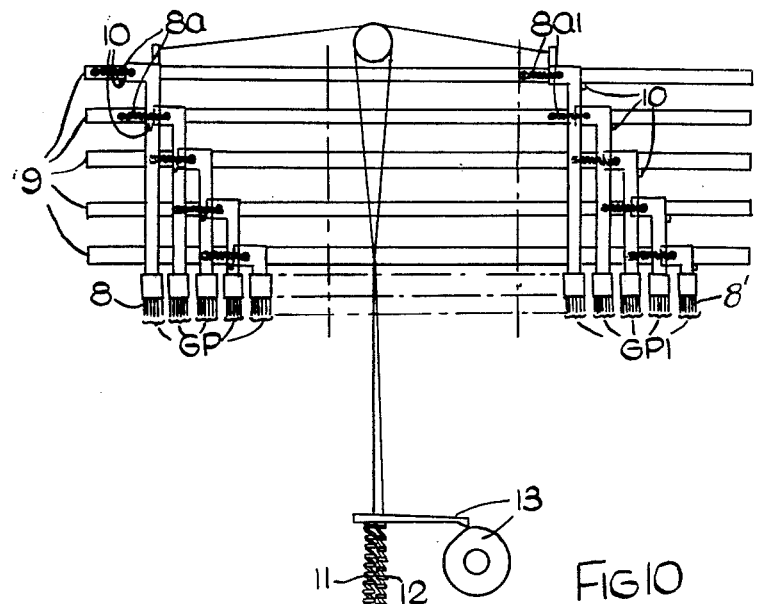
FIGURE 10 is a detail view of group point mechanism in the machine.

Said rods 5, 7 and points 4, 6 are then idled by suitable means, FIGURE 9, and groups GP, GP1, FIGURE 10, of points 8, 8' on two or more mounting bars 9 are introduced, FIGURE 9, one set of the groups GP of points 8, FIGURE 11, registering with the spaced groups of loops GL in one half of the needle row, and the other set of the groups GP1 of points 8' registering with the groups GL1 of loops on the other half of the needle row.

These groups GP, GP1 of points 8, 8' in this example are spring biased (FIGURE 10) outwardly to engage locating stops 10, and there are stronger springs 11, 12 which are normally rendered inoperative, by cam means 12, and are arranged for subsequently springing the groups GP, GP1 of points 8, 8' inwardly.

Figure 12:
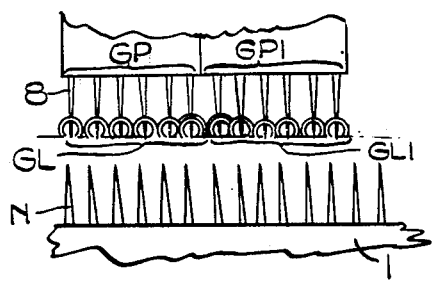
Figure 13:
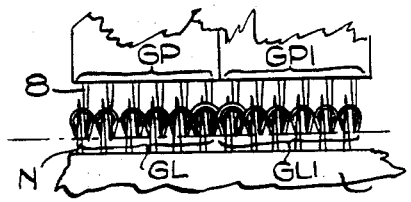

The two sets of groups GP, GP1 of points 8, 8' are operated by the narrowing head 2 to have usual two dipping and rising movements, with a cam operation of said stronger springs 11, 12 (to render them operative) between the two movements. Consequently in the first dip and rise, the groups GP, GP1 of points 8, 8' pick up the spaced groups GL, GL1, FIGURE 11, of loops from the needles N, then said cam 13 operates so that the stronger springs 11, 12 overcome the other springs 8a, 8a1 and spring the groups GP, GP1 of points 8, 8' of the two sets inwardly, FIGURE 12, into close association so that the loops GL, GL1 are in a continuous row, i.e. not in spaced groups. Next, in the second dip and rise the groups GP, GP1 of points 8, 8' transfer the loops back to the needles N, FIGURE 13, the number of needles then receiving the loops in a shortened continuous row being equal to the number of needles of the plain knitting machine on which a body fabric is to be started.

Figure 14:
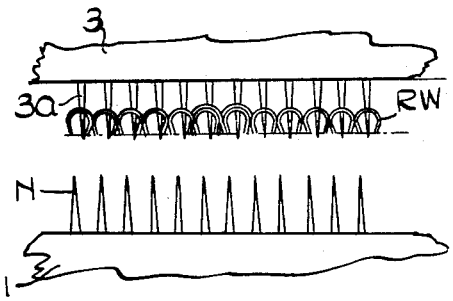

In a final operation, the groups GP, GP1 of points 8, 8' are rendered inoperative by suitable means, FIGURE 1 and the point bar 3 is re-introduced by the narrowing head 2 and the machine is operated for points 3a, FIGURE 14, of the point bar 3 to receive the shortened continuous row of rib welt loops RW from the needles N.

The point bar 3 is then removed from the machine, and is fitted in the plain knitting machine in usual manner for the rib welt to be transferred to the plain knitting machine needles so that body fabric can be knitted onto the rib welt.

It will be understood that by the use of the separate loop doubling machine to effect the double looping, the double looping operations can be effected at a considerably greater rate than when effected manually during the running-on operation onto the running-on or transfer bar as in the past, and furthermore this relieves the running-on operator from the task of effecting the double looping so that the running-on of rib welts onto the running-on or transfer bars can be effected by the running-on operator also at a greater rate than in the past.

Figure 15:
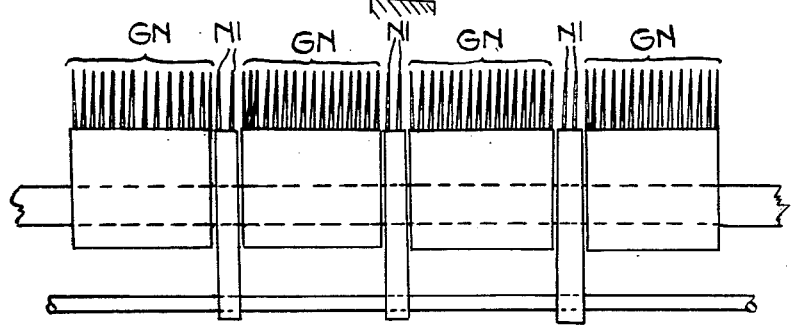
FIGURE 15 is a detail view of a modification using groups of needles.
Figure 16:
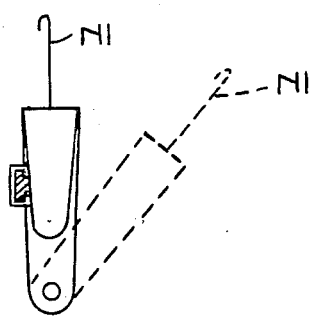
FIGURE 16 is a diagrammatic end view of FIGURE 15.

It is to be also understood that various modifications can be made without departing from the essence of the invention. For example instead of using springs of different strength for the groups of points, the groups of points may be controlled in either or each direction by positive motion control means. In another example those pairs of needles N1 of the loop doubling machine from which loops are outwardly transferred may be laterally displaceable, FIGURES 15, 16, and the remaining spaced groups GN of needles may be inwardly displaceable for the closing of the groups of loops together, instead of employing for the purpose the aforesaid groups of points.

In the ensuing particular description of the machine, the word "usual" is used in respect of a straight bar knitting machine of the Cotton's patent type.

Figure 17:
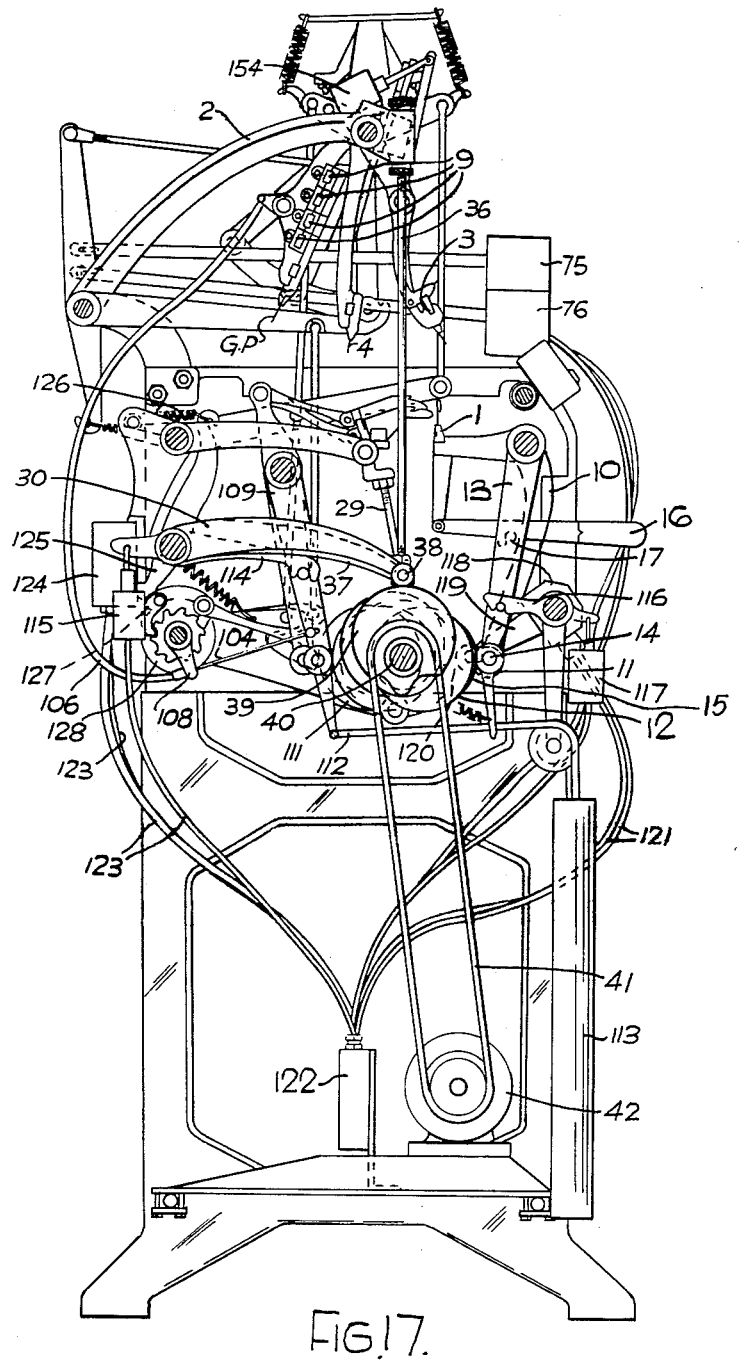
FIGURE 17 is a sectional view of the machine in greater detail.

From FIGURE 17, which shows the machine in greater detail, it will be seen that the needle bar 1 derives its vertical motion from the usual type of cam follower lever 10, cam follower 11 and cam 12, and the horizontal motion is obtained by the usual type of cam follower lever 13, cam follower 14 and cam 15, with usual hand lever 16 having releasable connection 17 with the lever 13 and connected to the bar 1 for hand manipulation of the needle bar 1.

Figure 18:
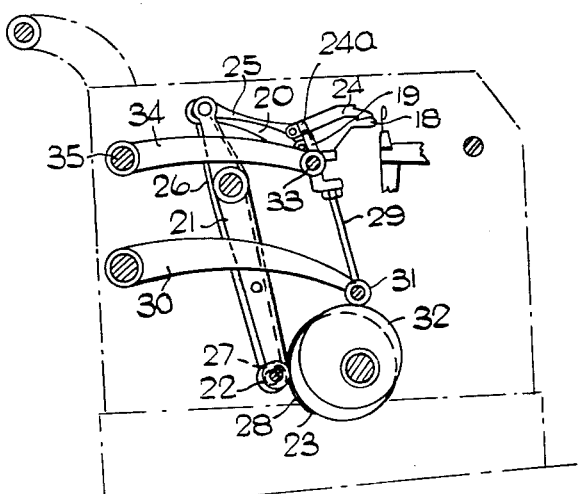
FIGURE 18 is a detail cross section of knocking over mechanism of the machine.

Usual type of knocking over bits 18 are employed and in this instance they are carried by a bar 19 connected by a link 20, FIGURE 18, to a cam follower lever 21 with cam follower 22 engaging cam 23.

Instead of the usual type sinkers operated by slurcocks and a catch bar, sinkers 24 are employed and are mounted and controlled, similar to the knocking over bits 18, by being mounted on a sinker bar 24a which is connected by a link 25 to a cam follower lever 26 with cam follower 27 engaging the cam 28.

Figure 19:
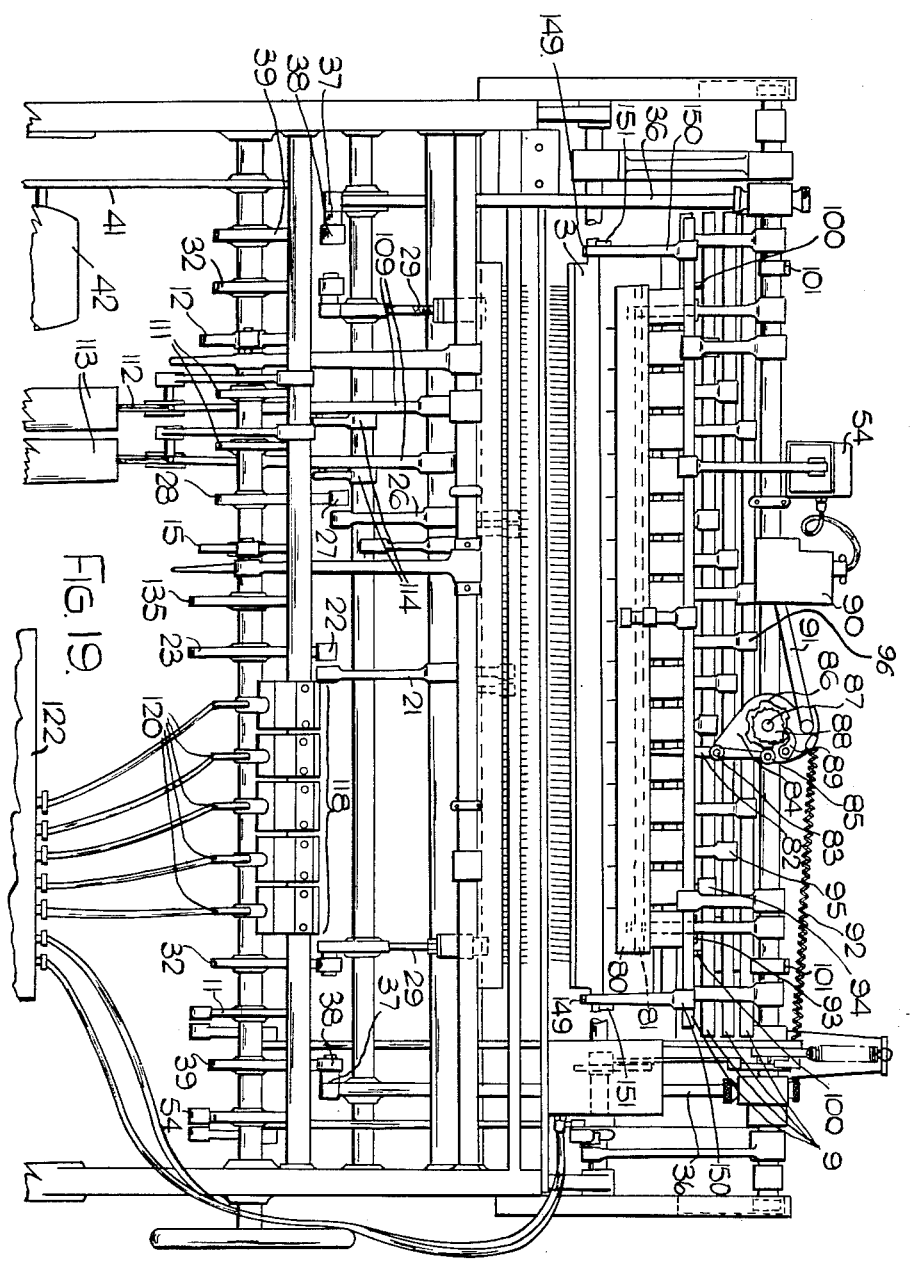
FIGURE 19 is a front view of the machine in greater detail.

The knocking over bar 19 is also connected by a rod 29 to a cam follower lever 30 with cam follower 31 engaging cam 32 for raising and lowering movements of the knock over bits 18. The movements of the knocking over bits 18 and sinkers 24 are pivotal by reason of the knocking over bar 19 and the sinker bar 24a being pivotally mounted on a rod 33 which is connected by arm 34 to a frame rod 35. As shown in FIGURE 19 there are two of the connecting rods 29 with two cams 32.

The narrowing head 2 derives its dipping and raising movements from two rods 36 each connected to a cam follower lever 37 with cam follower 38 engaging cam 39.

The cam shaft 40 is driven through drive transmitting means 41 from an electric motor 42.

FIGURE 20 illustrates that for each of the three swinging displacements of the point bar 3, the spaced single points 4 and the groups of points GP, GP1, they are located in position by employment of a quadrant 43 pivoted on a rod 44 of the narrowing head and having three spaced rollers 45, 46, 47 which are releasably engageable with a forked end 48a of a lever 48 which is pivoted at 49 to a frame part 50 and is attached by a link 51 to a cam follower lever 52 with cam follower 53 engaging a cam 54 on the cam shaft 40.

This FIGURE 20 also shows that the point bar 3 is releasably locatable in a forked part 149 of two arms 150 (see also FIGURE 19 for the second arm 150). Latches 151 releasably hold the bar 3 in position, and the arms 150 are pivoted at 152 to arms 153 pivoted on the pivot 44. The arms 150 are movable with a pressing movement of the points 3a against the needles N by a solenoid 154 which is connected to the pivot 152 by a link 155. FIGURE 20 shows the position ready for the points 3a to be lowered into engagement with the needles N, by dipping of the narrowing head 2.

FIGURE 21 shows the second position ready for the spaced single points 4 to be lowered by the narrowing head, and FIGURE 22 shows the third position where the groups of points GP are ready for lowering by the narrowing head.

Mechanism for obtaining the three different swinging positions is shown in FIGURE 23. This mechanism comprises a ratchet wheel 56 on the pivot 44 and having oppositely directed ratchet teeth at opposite sides thereof for engagement respectively by pawls 57, 58 carried by arms 59, 60 which are biased upwardly by springs 61, 62 against adjustable stops 63, 64. The pawls are operated through link connections 65, 66 to a lever 67 which is also connected by a link 68 to a cam follower lever 69 with cam follower 70 engaging a cam 71 on the cam shaft 40. Link connections 65 and 68 are connected by pivot means 67a. The pawls 57, 58 are under control of a cam control disc 72 on the pivot 44 and connected by a link 73 to a lever 74 which is pivoted on the pivot 49 and is controlled by solenoids 75, 76 through connecting rods 77, 78 acting against spring means 79. The function of the cam control disc is to raise and hold each pawl in turn clear of the ratchet teeth while allowing the other pawl to engage the ratchet teeth.

Figure 24:
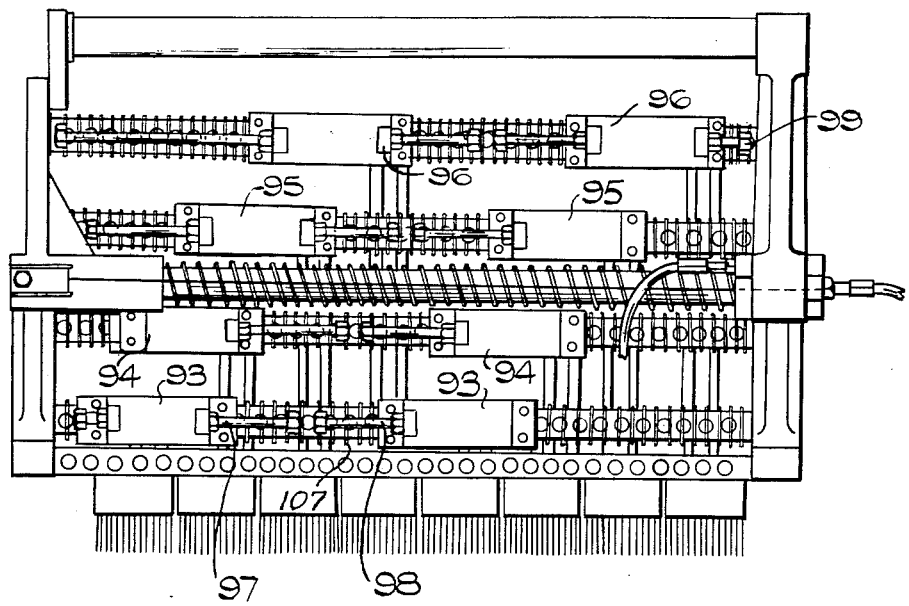
FIGURE 24 is a detail view of a rear part of the machine showing group point mechanism.
Figure 25:
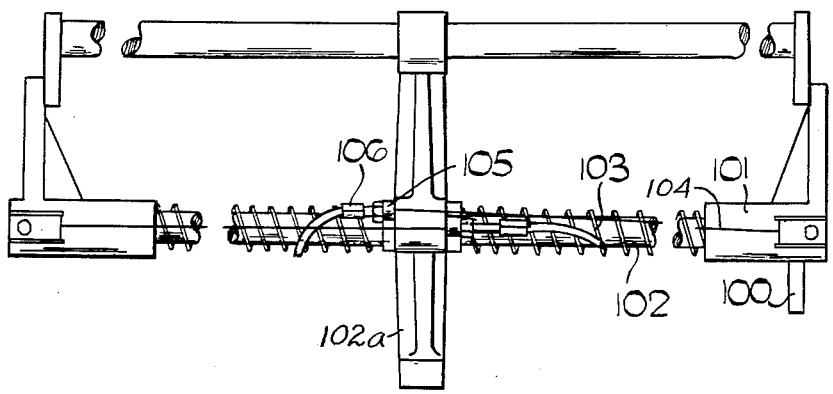
FIGURE 25 is a detail view of group point control mechanism.
Figure 26:
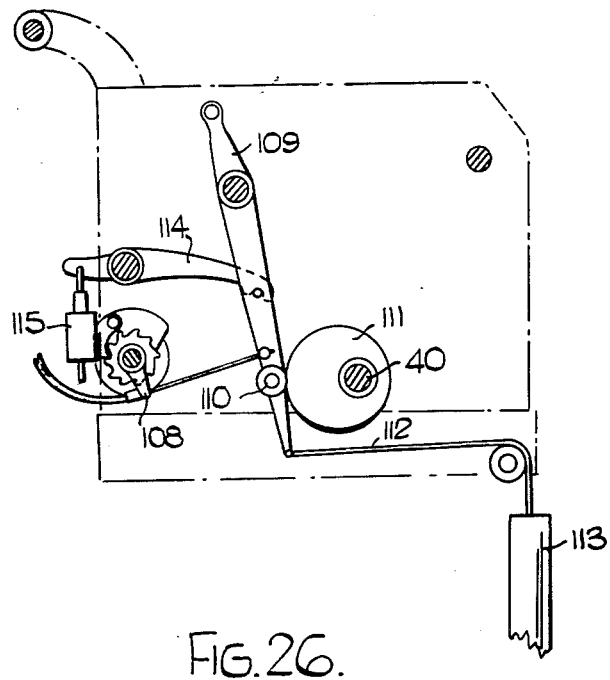
FIGURE 26 is a detail sectional view of further group point control mechanism.

Control of the spaced points 4 in respect of sideways movement is effected by having the points in this instance on a single bar 80, FIGURE 19 (not two bars as in FIGURES 5 to 7), slidably mounted on slide means 81 and slidable by a lever 82 pivoted at 83 to a bracket 84 and having a cam follower 85 engaging a Dawson wheel 86. The latter is mounted on a pivot 87 on which there is also mounted a ratchet wheel 88 engaged by a ratchet pawl 89 carried by the bracket 84. The latter is under control of a solenoid 90 to which it is connected by a link 91, against a spring 92. For operation of the groups of points GP they are mounted on four bars 9 by brackets 93, 94, 95, 96 in a four group sequence, that is to say, groups Nos. 1 and 5 from each end are mounted on the lowermost bar 9, groups Nos. 2 and 6 from each end are mounted on the next adjacent bar 9, groups Nos. 3 and 7 are mounted on the next adjacent bar 9 and groups Nos. 4 and 8 are mounted on the uppermost bar 9. The relationship between each pair of the groups of points mounted on the same bar is adjustable by screw means such as indicated at 97, 98 in FIGURE 24, and the end position is adjustable by adjustable screw 99 in relation to a stop 100. The stop 100, FIGURE 25, is carried by a bracket 101 which is slidably mounted on a rod 102 carried by a stationary bracket 102a with a spring 103 to bias the stop in an outward direction by being interposed between the bracket 102a and the slidable bracket. The stop bracket 101 is connected to the core 104 of a Bowden cable which extends through a stop bracket 105 for the sheath 106 of the Bowden cable. This mechanism 100 to 106 is for control of the one half set of the groups of points and it is duplicated in opposed manner for control of the other half set of the groups of points. Between the brackets carrying the groups of points there are springs such as at 107, FIGURE 24, for biasing the groups of points outwardly, and for moving the groups of points inwardly the sheath of the Bowden cable 106 extends to a bracket 108 FIGURE 26 and the core 104 extends through the bracket 108 and is connected to a cam follower lever 109 with a cam follower 110 engaging a cam 111 on the cam shaft 40. The cam follower 110 is weighted against the cam 111 by a line 112 connecting the lever 109 to a weight 113, there being one of each of these mechanisms for the different sets of groups of points, see FIGURE 19. The cam follower levers 109 are capable of being releasably held in inoperative position by catch arms 114 under control of a solenoid 115.

There is also a releasable catch control for the raising and lowering of the needles N. For this purpose there is a catch 116, FIGURE 17, controlled by a solenoid 117.

For operation of the different solenoids, there is a suitable switch mechanism 118, FIGURES 17 and 19, five switches of which are operated by cam follower levers 119 engaging cams 120 on the cam shaft 40. Reading from left to right No. 1 cam is for a motion stop switch, No. 2 cam is for the solenoid 90 for the single points 4, No. 3 cam is for the solenoid 115 for the groups of points, No. 4 cam is for the solenoid 117 for the needle bar catch, and No. 5 cam is for the solenoid 154 for the points 3.

Electrical connections such as 121 connect these switches to a suitable junction box 122 from which connections such as 123 are taken to a timing switch box 124 containing timing control switches.

Figure 27:
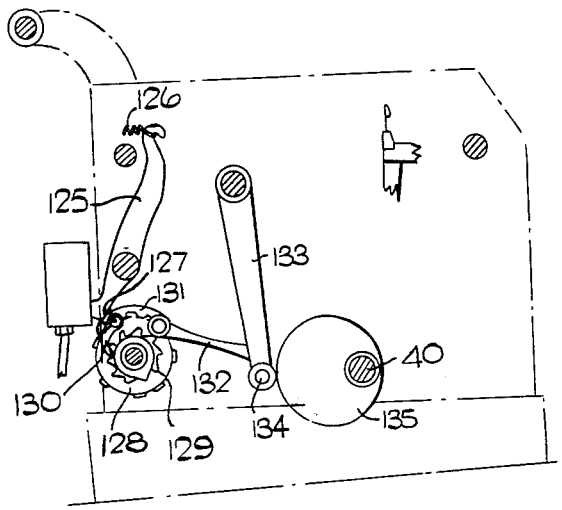
FIGURE 27 is a detail sectional view of timing control mechanism.

These timing control switches are operated by levers such as 125 biased by springs such as 126 and having noses 127 engaging a pattern drum 128 as most clearly shown in FIGURE 27. The pattern drum 128 is racked round with a ratchet wheel 129 by a ratchet pawl 130 carried by a plate 131 which is connected by a link 132 to a cam follower lever 133 with a cam follower 134 engaging a cam 135 on the cam shaft 40.

Figure 28:
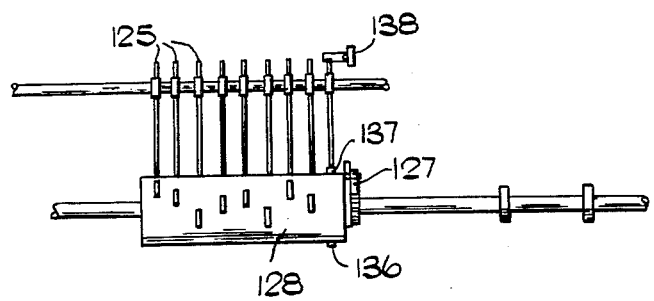
FIGURE 28 is a side view of part of the timing control mechanism.

FIGURE 28 is a diagram showing the pattern drum 128 with its associated levers 125 of which, reading from left to right, Nos. 1 and 2 are spares, No. 3 is for control of the needle bar lock solenoid 117, No. 4 is for control of the solenoid 115 operating the catch 114, No. 5 is for control of the solenoid 154 for the point bar 3, No. 6 is for control of the Dawson wheel solenoid 90, No. 7 is for control of the backward swing solenoid 75, No. 8 is for control of the forward swing solenoid 76 and No. 9 is a stop control for stopping the motor.

The general principle of operation is that a complete cycle of operations requires five revolutions of the cam shaft 40, and the pattern drum 128 has a complete set of pattern bits for each half revolution so that a complete cycle of movements requires only half a revolution of the pattern drum 128, the machine being automatically stopped at the end of a cycle of operations by bits 136, 137 at opposed positions on the drum 128 operating one of the levers 125 to close a motor control switch 138 controlling the motor 42. It will be understood that all the cams will rotate during the five revolutions of the cam shaft but only certain ones are required to operate at certain times and it is for this reason that various mechanisms are under control of the pattern drum 128 and the timing switches operated by the control levers 125.

Specifically the first main operation entails operation of cam 39 to lower the narrowing head 2 and operation of the solenoid 154 at the required time by the pattern drum 128 operating control lever No. 5. In this lowering motion the cam followers 53 and 70 are lowered off their cams, the needle bar is operated by its cams and the knocking over bits and sinkers are operated by their cams. The cam 111 for control of the groups of points is at this stage rendered inoperative by the catch 114 holding the cam follower 110 clear of the cam.

The second main operation again entails lowering of the narrowing head 2 by the cam 39, after operation of the cam 54 to release the quadrant 43 and then to re-lock it, after operation of cam 71 to cause a forward rack (by control lever No. 8 operating solenoid 75) of the ratchet wheel 56 so that the single points 4 are ready for operation.

Following the first lowering and raising of the points 4 in each of two loop transfer operations the solenoid 90 is caused by control lever No. 6 to effect suitable endwise movements of the point bar 80, for transfer of the appropriate loops in opposite direction (this being accomplished by a single bar of points, instead of the double bar of points, by virtue of the Dawson wheel control). Each endwise movement is followed by the second operation of cam 39 to again lower and raise the narrowing head 2.

For the third main operation the solenoid 115 is operated by control rod No. 4 to release the cam follower 110 to be operated by the cam 111 so that following the first lowering of the narrowing head 2 with the groups of points spaced by the springs, a second lowering and raising of the narrowing head 2 by the cam 39 is followed by the cam 111 allowing the weights 113 to operate the Bowden cable mechanism 104, 106 to displace the outermost groups of points inwardly, which groups of points act on the next adjacent groups of points, and so on, so that all the groups of points are closed together. The next lowering of the narrowing head 2 by the cam 39 is for the return by the closed groups of points to the needles N.

Next a control arm No. 7 is operated for operation of solenoid 76 to cause back racking of the swinging points to the starting position, and the next lowering and raising of the narrowing head 2 is for the final transfer of the loops from the needles N to the point bar. The final lowering and raising of the narrowing head 2 by the cam 39 is caused to be an idle motion by the needle bar catch solenoid 117 being operated by control arm No. 3.

This is followed by a bit 137 on the pattern drum operating control arm No. 9 to stop the machine, one of the switches in the switch mechanism 118 having been already operated by one of the cams 120.

What I claim is:

1. A method of producing knitted garments wherein knitted fabric is produced on one knitting machine with a fabric transfer course away from said one machine and having a predetermined number of successive fabric transfer loops, sideways transfer of spaced loops is effected to reduce the number of successive loops in the fabric transfer course, and the consequently reduced length fabric transfer course is transferred to needles of another knitting machine for further knitted fabric to be knitted on to the preformed knitted fabric starting with a course having the same reduced number of successive loops as the reduced length fabric transfer course, characterised by the intermediate operational steps after forming the fabric transfer course with said predetermined number of successive loops on said one machine, of operating transfer points to sideways transfer spaced loops in the fabric transfer course, taking the consequently spaced groups of loops in the fabric transfer course on correspondingly spaced groups of instruments, and closing the groups of instruments together.

2. A method according to claim 1 which includes transferring the loops of the fabric transfer course from the needles of said one machine to a corresponding number of points on a point bar, and in a separate operation away from said one machine effecting sideways transference of spaced loops by transfer points, followed by picking up spaced groups of loops by spaced groups of points and closing the groups of points together.

3. A method according to claim 2 which includes operating at least one bar of spaced single transfer points to effect the sideways transfer of spaced loops.

4. A method according to claim 3 which includes transferring the fabric transfer course of loops from the point bar to machine knitting needles, operating transfer points to co-operate with the needles to effect the sideways transference of the spaced loops from their needles to next adjacent needles, operating groups of transfer points to pick up the consequently spaced groups of loops from the needles, closing the groups of points together, transferring the consequently closed groups of loops to the needles, and operating a point bar to pick up the closed groups of loops from the needles.

5. A method according to claim 4 which includes operating a narrowing head, by which the various points are carried, with dipping and rising motions for the transfer operations.

6. A loop transfer machine comprising a row of machine knitting needles, cam operated means for operation of the row of needles in the transference of loops to and from the needles, a narrowing head, cam operated means for operating the narrowing head with dipping and rising motions, transferring mechanism carried by the narrowing head and comprising a first transfer device and a second transfer device spaced angularly from said first transfer device, cam operated means for displacing the transfer mechanism to displace said first transfer device and said second transfer device between operative and inoperative positions, means adapting said first transfer device to removably carry a point bar, said second transfer device comprising a plurality of groups of points mounted for sideways displacement relatively to each other, and means for effecting said sideways displacement of said groups of points, whereby the point bar and the groups of points can be brought separately into loop transfer co-operation with the row of needles and the groups of points can be at one time spaced and at another time together.

7. A machine according to claim 6 having a third transfer device disposed angularly intermediate the first and second transfer device and comprising at least one bar of spaced single transfer points and movable by the cam operated means for said first and second transfer devices, whereby these spaced points can be brought into and out of loop transfer co-operation with the needles, and means whereby the spaced single transfer points can be sideways displaced for sideways loop transference.

8. A machine according to claim 7 having solenoid control mechanism for controlling the direction of displacement of the transfer devices, solenoid mechanism for idling the sideways displacing means for the groups of points in the second transfer devcie, solenoid means for effecting pressure of the points in the first transfer device against the needles, a solenoid device for effecting the sideways displacement of the spaced single points in the third transfer device, and a solenoid device for idling part of the needle operating mechanism.

9. A machine according to claim 8 having electric switches for said solenoids operated by cam operated mechanism, timing electric switches operated by a pattern drum, cam operated mechanism operating the pattern drum, and means interconnecting the electric switches whereby the solenoids are operated at required times.

10. A machine according to claim 9 having means for locating the transfer devices in their operative positions comprising a quadrant device movable with the transfer devices, catch means releasably engageable with the quadrant at different positions, and cam operated means for controlling the catch device.

11. A machine according to claim 10 wherein the groups of points are mounted in sequence on a plurality of guide bars, spring means biases the groups of points apart, adjustable stop means controls the spacing of the groups of points, and Bowden cable mechanism is operated by cam controlled weight mechanism to close the groups of points together.

12. A machine according to claim 11 having knocking over bits co-operating with the needles, cam operated mechanism for operating the knocking over bits, sinkers for co-operating with the needles, and cam operated mechanism for operating the sinkers.

References Cited by the Examiner
UNITED STATES PATENTS 1,995,279  3/1935  Magnier _____ 66—148
2,363,008  11/1944  Lambach _____ 66—148 X DONALD W. PARKER, *Primary Examiner.*

P. C. FAW, *Assistant Examiner.*